(12) United States Patent
Lee et al.

(10) Patent No.: US 7,209,590 B2
(45) Date of Patent: Apr. 24, 2007

(54) CODING AND DECODING APPARATUS OF KEY DATA FOR GRAPHIC ANIMATION AND METHOD THEREOF

(75) Inventors: Shin-jun Lee, Seoul (KR); Sang-oak Woo, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 703 days.

(21) Appl. No.: 10/188,856

(22) Filed: Jul. 5, 2002

(65) Prior Publication Data

US 2003/0007694 A1    Jan. 9, 2003

(30) Foreign Application Priority Data

Jul. 7, 2001    (KR) ............... 2001-40707

(51) Int. Cl.
*G06K 9/36*    (2006.01)
*G03M 7/00*    (2006.01)
(52) U.S. Cl. ............... 382/232; 382/236; 382/243; 341/50
(58) Field of Classification Search ............... 382/232, 382/236, 238, 243–248, 233; 341/50; 345/473, 345/475
See application file for complete search history.

(56) References Cited

U.S. PATENT DOCUMENTS

| | | | |
|---|---|---|---|
| 6,559,848 B2 * | 5/2003 | O'Rourke ............... 345/473 |
| 6,591,019 B1 * | 7/2003 | Comair et al. ............... 382/248 |
| 6,704,890 B1 | 3/2004 | Carotti et al. |
| 6,798,835 B2 | 9/2004 | Sugiyama |
| 6,891,565 B1 | 5/2005 | Dieterich |
| 6,909,746 B2 * | 6/2005 | Trovato ............... 382/233 |
| 6,934,417 B2 * | 8/2005 | Easwar et al. ............... 382/246 |

FOREIGN PATENT DOCUMENTS

| | | |
|---|---|---|
| JP | 2000 3194 | 1/2000 |
| JP | 2001 45496 | 2/2001 |

OTHER PUBLICATIONS

Office Action issued by the Japanese Patent Office on Nov. 10, 2004 in corresponding application JP 2002 196986.

* cited by examiner

*Primary Examiner*—Duy M. Dang
(74) *Attorney, Agent, or Firm*—Buchanan Ingersoll & Rooney PC

(57) ABSTRACT

An apparatus for coding keys of graphic animation data and a method thereof are provided. The coding apparatus for encoding key data corresponding to time variables among graphic animation comprises a quantizer which quantizes the key data and generates quantized data; a differential pulse code modulation (DPCM) processing unit which DPCM processes the quantized data, receives the DPCM processed data, and by repeatedly performing DPCM processing, selects and outputs DPCM data having the lowest dispersion among N-th order DPCM data generated in the DPCM processing; a polar value removing unit which reduces the range of data by removing a polar value in the DPCM data output form the DPCM processing unit; and an entropy encoder which removes the redundancy of binary bits in the data output from the polar value removing unit and generates a compressed and encoded binary bit stream. In the method, by selecting a code where data dispersion is the lowest according to the characteristic of key data to be coded, redundancy of data to be coded increases such that coding efficiency increases. Also, by removing polar values appearing after DPCM, the coding efficiency increases.

33 Claims, 11 Drawing Sheets

CODING AND DECODING APPARATUS OF KEY DATA FOR GRAPHIC ANIMATION AND METHOD THEREOF

Priority is claimed to Patent Application Number 2001-40707 filed in Republic of Korea on Jul. 7, 2001, herein incorporated by reference.

BACKGROUND OF THE INVENTION

1. Field of the Invention

The present invention relates to a coding and decoding apparatus of graphic animation data, and more particularly, to a coding and decoding apparatus of key information corresponding to time variables among the graphic animation data, and a method thereof.

2. Description of the Related Art

Graphic animation represents shape and attributes information of a 2-dimensional or 3-dimensiontal object, and expresses information on change and motion of the shape or attributes of each object with respect to time in a variety of ways. As a leading representation method for computer animation of an object on a time axis, there is a virtual reality markup language (VRML). This animation method is a key framing method for a 3-dimensional object, wherein a predetermined key frame is set on an arbitrary time axis, computer animation between respective set key frames is expressed by linear interpolation. The key frame used in this method is defined by an interpolator node, which consists of key data indicating key frame's location on the time axis and a key value data indicating the attributes of the key frame and motion information. That is, the key represents a time for expressing computer animation as a discontinuous value between 0 and 1, and the key value represents the attribute and location value of an object in a synthesized image at a time indicated by each key. FIG. 1 is a graph showing an example of the correlation between a key and a key value.

Meanwhile, when smooth computer animation similar to actual moving body is expressed according to the key framing method having the characteristic of a piecewise linear interpolation, a large amount of key frame information should be provided through interpolate nodes, and this causes a serious demerit in cost and efficiency when the method is used in application fields. That is, in off-line applications, a storage apparatus with a large capacity for storing a large amount of 3-dimensional animation data is needed. Also, in on-line applications, in addition to the problem in the off-line applications, high capacity and high speed of transmission channels for transmitting 3-dimensional animation data from a server to user terminals are needed. At the same time, due to increases in possible transmission errors, reliability of data is degraded. Accordingly, effective compression and coding function which can reduce the amount of node data is needed.

FIG. 2 is a schematic block diagram of the prior art coding and decoding apparatus.

Referring to FIG. 2, in the prior art, a method coding animation data using differential pulse code modulation (DPCM) is generally used. The characteristic of the key framing animation matches well with the DPCM method, and the method is appropriate to compress data. Also, the method using DPCM is used as an MPEG-4 binary format for scene (BIFS) coding method.

As shown in FIG. 2, a method for coding key data in an MPEG-4 BIFS coding method uses a first order DPCM in which DPCM processing is performed only once. In FIG. 2, a quantizer 105 quantizes key data K of an interpolator node to be coded. A DPCM processing unit 110 generates a differential value $E^K$ between neighboring data on a time axis in the quantized key data $Q^K$. The DPCM processed key data is input to an entropy encoder 115, and a compressed binary bit stream 120 is generated. The compressed binary bit stream 120 generated in an encoder 100 is generated as a restored key data item K^ through a decoder 150 which is constructed as an inverse process of the encoder 100. That is, the compressed binary bit stream 120 is restored to key data K^ through an entropy decoder 155, an inverse DPCM 160, and an inverse quantizer 165.

FIG. 3 is a detailed diagram of a DPCM shown in FIG. 2, and FIG. 4 is a detailed diagram of an inverse DPCM shown in FIG. 2.

Meanwhile, in order to increase the efficiency of coding in the entropy encoder 115, it is preferable that redundancy of data to be encoded, that is, data $E^K$ output from the DPCM processing unit 110 is high. However, if only the first order DPCM is performed for all as shown in FIG. 2, the effect of compression is not so high for data other than those data for which encoding through the first DPCM is appropriate.

SUMMARY OF THE INVENTION

To solve the above problems, it is a first objective of the present invention to provide an encoding/decoding apparatus which increases coding efficiency by increasing redundancy of key data to be encoded.

It is a second objective of the present invention to provide an encoding/decoding method which is performed in the encoding apparatus.

It is a third objective of the present invention to provide a recoding medium on which the encoding/decoding method is recorded as computer executable program code.

It is a fourth objective of the present invention to provide a recoding medium on which a bit stream which is generated by the encoding apparatus or the encoding method is recorded as a computer executable program code.

It is a fifth objective of the present invention to provide a method for removing a polar value in data to be encoded in order to increase coding efficiency in the encoding apparatus.

It is a sixth objective of the present invention to provide a data processing system using the encoding apparatus.

To accomplish the first objective of the present invention, there is provided a coding apparatus for encoding key data corresponding to time variables among graphic animation, the coding apparatus comprising a quantizer which quantizes the key data and generates quantized data; a differential pulse code modulation (DPCM) processing unit which DPCM processes the quantized data, receives the DPCM processed data, and by repeatedly performing DPCM processing, selects and outputs DPCM data having the lowest dispersion among N-th order DPCM data generated in the DPCM processing; a polar value removing unit which reduces the range of data by removing a polar value in the DPCM data output form the DPCM processing unit; and an entropy encoder which removes the redundancy of binary bits in the data output from the polar value removing unit and generates a compressed and encoded binary bit stream.

To accomplish the first objective of the present invention, there is provided a decoding apparatus which receives a binary bit stream from an external coding apparatus, the binary bit stream obtained by compressing and encoding header data, which includes information on a DPCM order having the lowest dispersion, information on a divide order having the lowest dispersion, a most frequent value, a maximum value, and information on a polar value for each divide order that are used in a polar value removing process in the coding apparatus, and key data that is DPCM processed and polar value removing processed, and restores original key data corresponding to time variables in graphic animation data, the decoding apparatus comprising an entropy decoder which restores the header data and key data for which DPCM processing and polar value removing processing are performed, using the received binary bit stream; an inverse polar value removing unit which restores a polar value removed in a polar value removing process of the coding apparatus, using the most frequent value, the maximum value, and information on a polar value for each divide order of the header data restored in the entropy decoder; an inverse DPCM processing unit which repeatedly performs the inverse DPCM processing for the key data whose polar value is restored in the inverse polar value removing unit, and outputs the result, wherein the inverse DPCM processing is performed repeatedly the same frequency as the DPCM order having the lowest dispersion; and an inverse quantizer which inverse quantizes the inverse DPCM data that is output from the inverse DPCM processing unit, and generates the inverse quantized data as original key data.

To accomplish the second objective of the present invention, there is provided a coding method for coding key data corresponding to time variables among graphic animation data, the coding method comprising (a) quantizing the key data and generating quantized data; (b) differential pulse code modulation (DPCM) processing the quantized data, receiving the DPCM processed data, and by repeatedly performing DPCM processing, selecting and outputting DPCM data having the lowest dispersion among N-th order DPCM data generated in the DPCM processing; (c) reducing the changing range of data by removing a polar value in the DPCM data output in step (b); and (d) removing the redundancy of binary bits in the data output in step (c) and generating a compressed and encoded binary bit stream.

To accomplish the second objective of the present invention, there is provided a decoding method performed in a decoding apparatus which receives a binary bit stream from an external coding apparatus, the binary bit stream obtained by compressing and encoding header data, which includes information on a DPCM order having the lowest dispersion, information on a divide order having the lowest dispersion, a most frequent value, a maximum value, and information on a polar value for each divide order that are used in a polar value removing process in the coding apparatus, and key data that is DPCM processed and polar value removing processed, and restores original key data corresponding to time variables in graphic animation data, the decoding method comprising (a) restoring the header data and key data for which DPCM processing and polar value removing processing are performed, using the received binary bit stream; (b) restoring a polar value removed in a polar value removing process of the coding apparatus, using the most frequent value, the maximum value, and information on a polar value for each divide order of the header data restored in the step (a); (c) repeatedly performing inverse DPCM processing for the key data whose polar value is restored in the step (b), wherein the inverse DPCM processing is performed repeatedly the same frequency as the DPCM order having the lowest dispersion; and (d) inverse quantizing the data that is inverse DPCM processed in the step (c), and generating the inverse quantized data as the original key data.

To accomplish the fourth objective of the present invention, there is provided a storage medium for storing a bit stream generated in the coding apparatus or by the coding method, the storage medium comprising a header information which comprises: a field which stores the number of quantization bits to which key data is quantized; a field which stores the number of actual bits needed in encoding key data; a field which stores the number of bits needed in transmitting a mode value, a minimum value, and a maximum value; a field which stores the number of key data; a field which stores the order of DPCM having the lowest dispersion and the divide order having the lowest dispersion, respectively; and a field which stores a mode value, a minimum value, and a maximum value, respectively; and a key information field which stores encoded key data.

To accomplish the fifth objective of the present invention, there is provided another method for removing a polar value in data desired to be transmitted in order to increase coding efficiency in a coding apparatus for coding transmission data desired to be transmitted, the method comprising (a) obtaining data having a highest frequency among the transmission data as a mode value; (b) subtracting the mode value from the respective transmission data; (c) making data having less than 0 among the data processed in step (b) become positive number; (d) performing divide processing which reduces the data range between a maximum value and a minimum value by subtracting a predetermined value from the data processed in step (c) according to the size of data; (e) extracting a maximum value and a minimum value from the preprocessed data, comparing the absolute values of the maximum value and the minimum value, according to the result of comparison performing repeatedly M times a process in which data greater than half the maximum value are converted into a value approximated to 0, or data smaller than half the maximum value are converted into a value approximated to 0, and generating divide-processed data; and (f) calculating the dispersion of data generated in step (e) for each order, and selecting and outputting divide-processed data corresponding to an order having the lowest dispersion as data in which polar values are removed.

To accomplish the sixth objective of the present invention, there is provided a data processing system for coding and/or decoding key data corresponding to time variables among graphic animation data, the data processing system comprising an encoder which comprises: a quantizer which quantizes the key data and generates quantized data; a differential pulse code modulation (DPCM) processing unit which DPCM processes the quantized data, receives the DPCM processed data, and by repeatedly performing DPCM processing, selects and outputs DPCM data having the lowest dispersion among N-th order DPCM data generated in the DPCM processing; a polar value removing unit which reduces the changing range of data by removing a polar value in the DPCM data output form the DPCM processing unit; and an entropy encoder which removes the redundancy of binary bits in the data output from the polar value removing unit and generates a compressed and encoded binary bit stream; and a decoder which receives a binary bit stream which is compressed, coded, and transmitted from the encoder, and restores the binary bit stream to original key data through the inverse process of the encoding which is performed in the encoder.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 5:
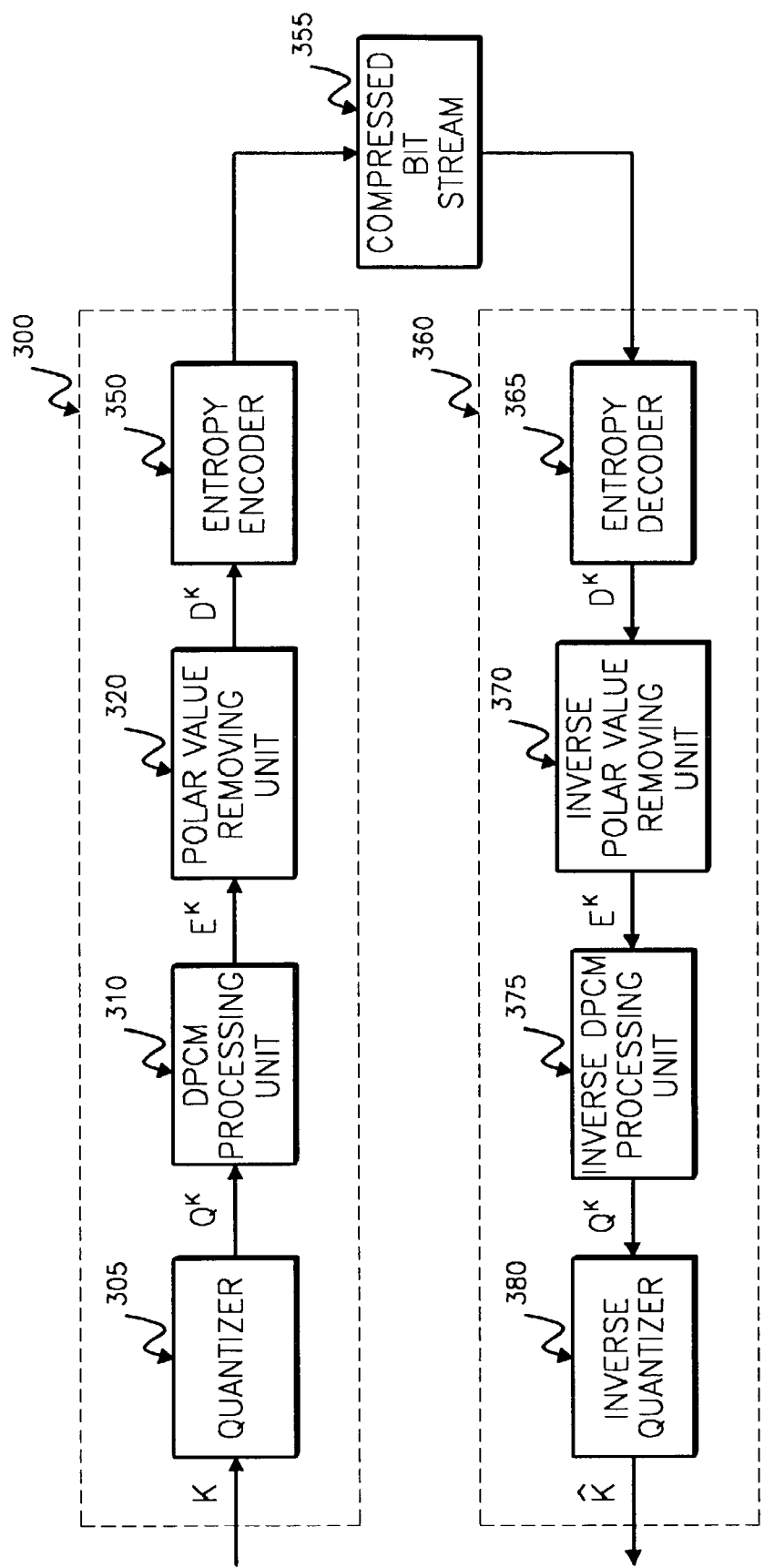
FIG. 5 is a schematic block diagram of a coding and decoding apparatus according to the present invention.

FIG. 5 is a schematic block diagram of a coding and decoding apparatus according to the present invention. An encoder 300 comprises a quantizer 305, a DPCM processing unit 310, a polar value removing unit 320, and an entropy encoder 350, and a decoder 360 comprises an entropy decoder 365, an inverse DPCM processing unit 375, an inverse polar value removing unit 370, and an inverse quantizer 380.

Referring to FIG. 5, the encoder 300 performs N-th order DPCM according the characteristics of key data K to be coded, selects DPCM data having the lowest dispersion among data for which DPCM were performed, removes polar values of the selected DPCM data, encodes the data, and generates a compressed bit stream 355.

More specifically, the quantizer 305 quantizes input key data K and generates quantized data $Q^K$. Here, key data K is data which was made to be a real number through a parsing process. This real number key data K is converted, that is, quantized, into key data $Q^K$ having an integer value according to the number of quantization bit QStep_K provided by the quantizer 305. If the number of keys is n and there are indexes from 0 to n−1, data $K_0$ to $K_{n-1}$ are converted into quantized data $Q_0$ to $Q_{n-1}$ in the quantizer 305.

The DPCM processing unit 310 DPCM processes the quantized data $Q_K$, and receives the DPCM processed data as an input, and then again DPCM processes the input data. That is, 1st DPCM receives and DPCM processes the quantized data QK, 2nd DPCM receives and DPCM processes the result of 1st DPCM, and 3rd DPCM receives and DPCM processes the result of 2nd DPCM. Then, the DPCM processing unit 310 obtains dispersion of each order DPCM data, and selects and outputs a DPCM data item having the lowest dispersion. For example, if the dispersion of 2nd order DPCM result data is the lowest, the DPCM processing unit 310 selects the 2nd order DPCM result data and outputs it to the polar value removing unit 320. If redundancy of data thus increases, the entropy encoder 350 which performs a following step can encode redundant data into one data item such that coding efficiency increases. The DPCM processing unit 310 will be explained in detail referring to FIG. 6.

The polar value removing unit 320 removes a polar value that may be in data $E^K$ output from the DPCM processing unit 310 so that data $D^K$ having a less range is generated. Polar values in data $E^K$ are far from the average of data, make data dispersion bigger, and degrade data compression coding efficiency. The polar value removing unit 320 will be explained in detail referring to FIG. 7.

The entropy encoder 350 removes redundancy, that is, the redundancy of binary bits, from data $D^K$, compresses and encodes the data, and generates a compressed binary bit stream 355. The structure of the compressed binary bit stream 355 will be explained in detail referring to FIG. 12.

The decoding process is the inverse of the encoding process described above. The binary bit stream data is input to the entropy decoder 365, is restored to integer data in the entropy decoder 365, and through the inverse process of the encoding process, is converted into a key value $\hat{K}$ of a restored real number. In the restored key data, the same error in the process of inverse quantization occurs as the error occurring in the quantization process.

Figure 6:
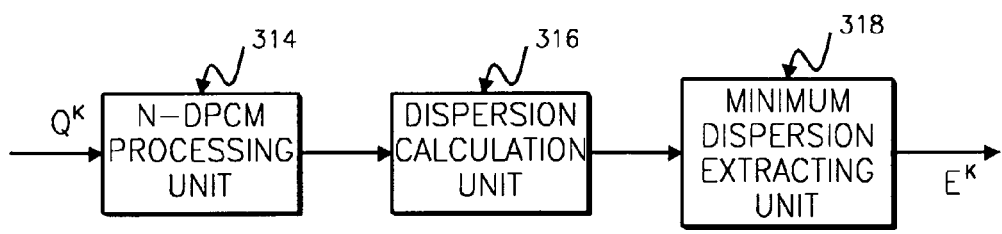
FIG. 6 is a block diagram showing a preferred embodiment of an N-th order DPCM processing unit of the present invention shown in FIG. 5.

FIG. 6 is a block diagram showing a preferred embodiment of the DPCM processing unit of the present invention shown in FIG. 5, which comprises an N-th order DPCM processing unit 314, a dispersion processing unit 316, and a minimum dispersion extracting unit 318.

Figure 1:
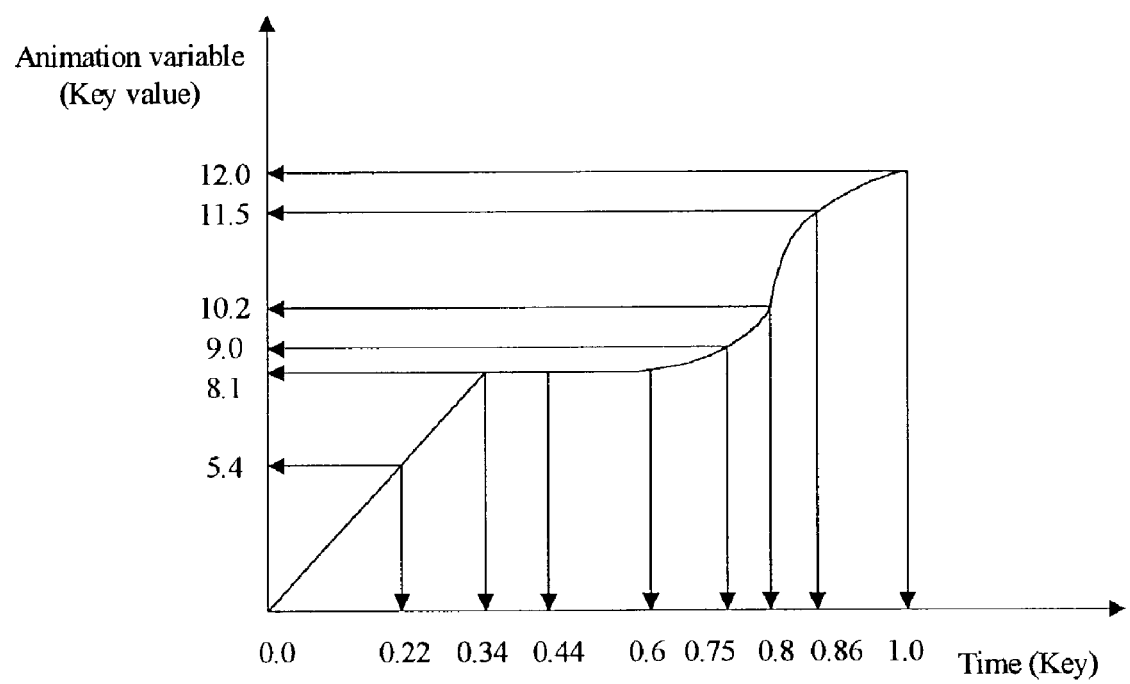
FIG. 1 is a graph showing an example of the correlation between a key and a key value.
Figure 2:
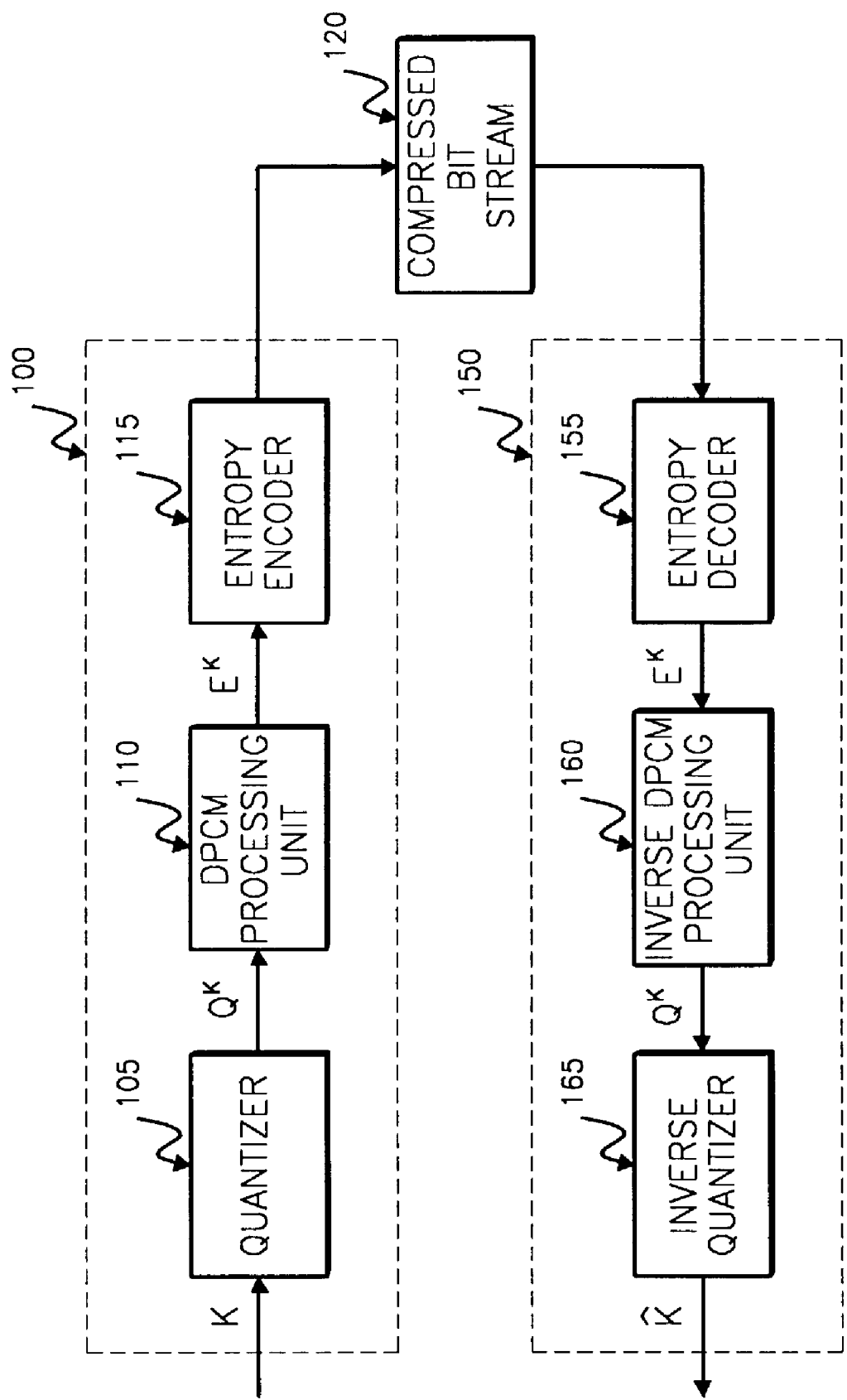
FIG. 2 is a schematic block diagram of the prior art coding and decoding apparatus.
Figure 3:
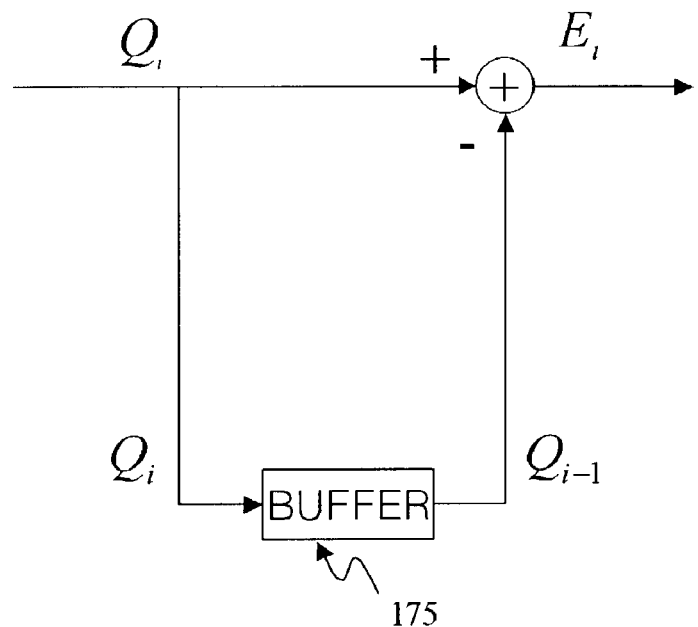
FIG. 3 is a detailed diagram of a DPCM shown in FIG. 2.
Figure 4:
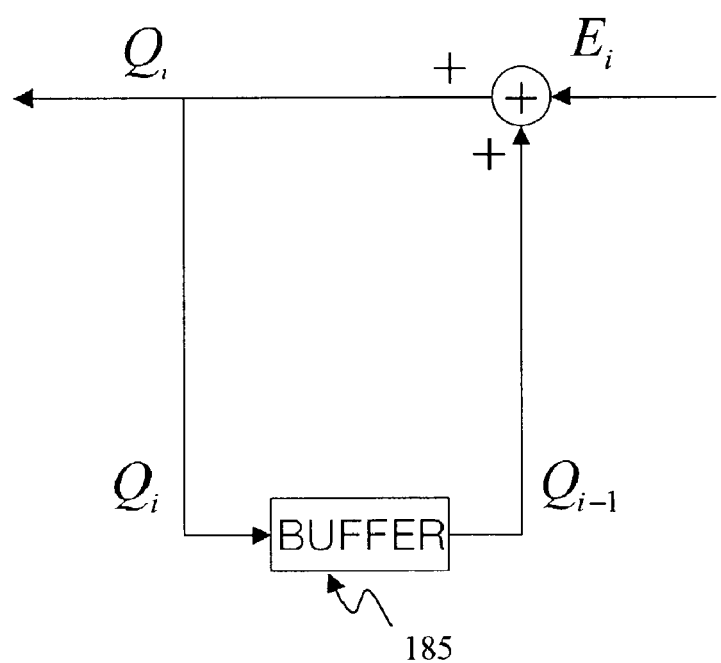
FIG. 4 is a detailed diagram of an inverse DPCM shown in FIG. 2.

The N-th order DPCM processing unit 314 receives currently quantized data $Q_i$, and performs N times DPCM processing, and outputs the result of the DPCM processing to the dispersion processing unit 316. In the first DPCM, a differential value which is the result of the first DPCM processing is obtained by subtracting previously quantized data $Q_{i-1}$ from the currently quantized data $Q_i$. In the second DPCM, a differential value which is the result of the second DPCM processing is obtained by subtracting previously first DPCM data from the currently first DPCM data. Using this method, DPCM processing is performed N times. The first DPCM process is as shown in FIG. 2. Referring to FIG. 3, buffer 175 is a midway buffer where current $Q_i$ is used as $Q_{i-1}$ when the next differential value is obtained.

The dispersion processing unit 316 obtains and outputs the dispersion of DPCM data which are output for respective orders. Among the measures of dispersion generally used, there are variance, standard deviation, quartile deviation, and range.

If the dispersion processing unit 316 outputs dispersion values of respective orders, the minimum dispersion extracting unit 318 selects and outputs DPCM data corresponding to an order having the lowest dispersion.

Figure 7:
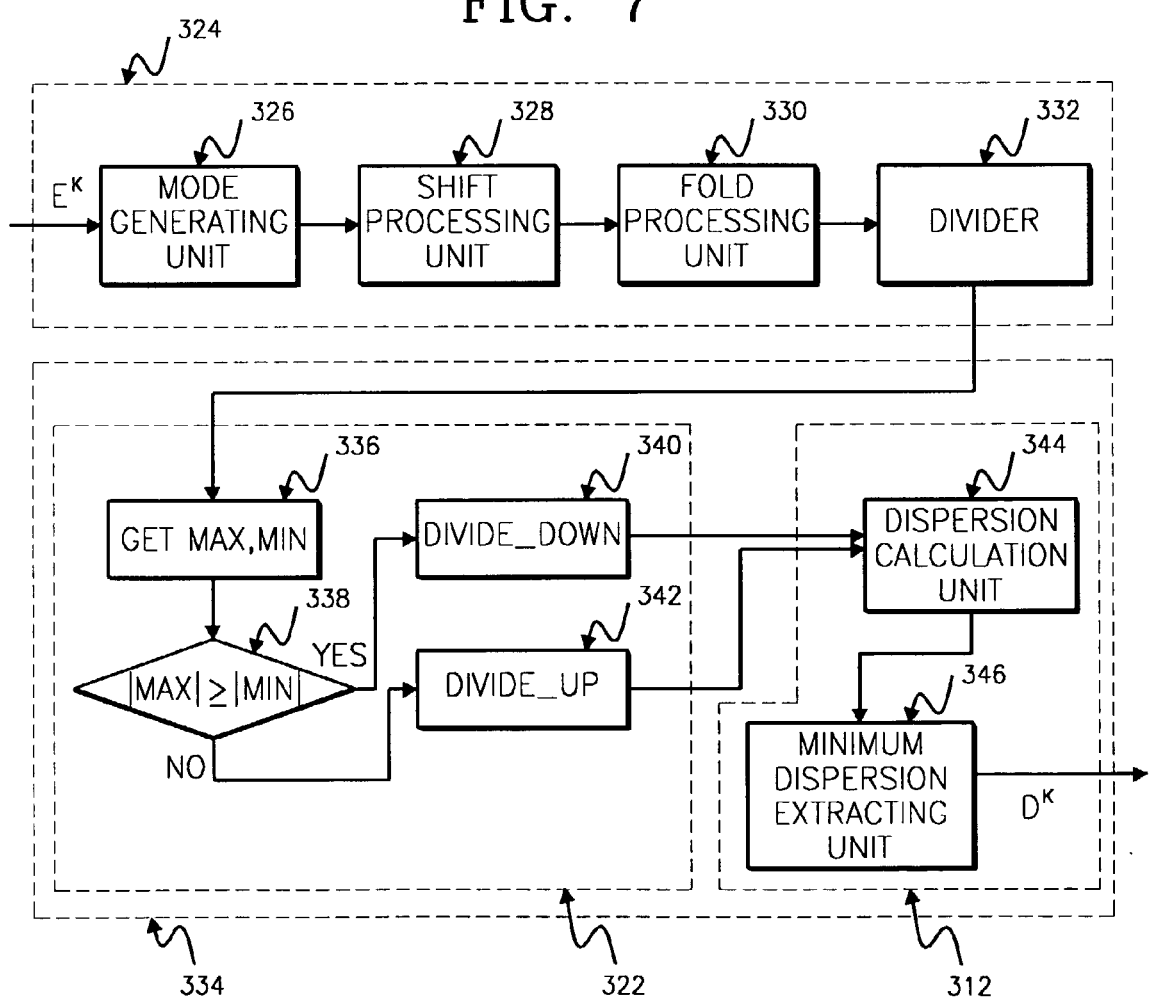
FIG. 7 is a block diagram showing a preferred embodiment of a polar value removing unit of the present invention shown in FIG. 5.

FIG. 7 is a block diagram showing a preferred embodiment of a polar value removing unit of the present invention shown in FIG. 5. The polar value removing unit comprises a preprocessing unit 324 and a main processing unit 334.

The preprocessing unit 324 performs a preprocess for removing a polar value. The preprocessing unit 324 makes a data item having a high frequency among data output from the DPCM processing unit 310, to a predetermined value, for example, 0, and makes other data items to be dispersed around 0. More specifically, the preprocessing unit 324 comprises a mode generating unit 326, a shift processing unit 328, a fold processing unit 330, and a divider 332.

The mode generating unit 326 obtains a data item having the highest frequency among differential data $E_K$ output from the DPCM processing unit 310, that is, a mode.

The shift processing unit 328 subtracts the mode obtained in the mode generating unit 310 from all differential data as presented in equation 1:

$$E_i^K = E_i^K - \text{mode} \qquad (1)$$

Thus, if the mode is subtracted from differential data, the differential data having the same value as the mode become 0, and the remaining differential data are converted into values obtained by subtracting the mode from the differential data, that is, are shifted the same as the mode value. Then, the shifted data are converted into data having characteristics of being distributed around 0.

The fold processing unit 330 makes values less than 0, that is, negative values, into positive values. The fold processing unit 330 will be explained in detail referring to FIG. 8.

The divider 332 performs a process for reducing data range between the maximum value and the minimum value by subtracting a predetermined value from the data processed in the fold processing unit 330, according to the size of data, and will be explained in detail referring to FIG. 9.

If thus the preprocessing process for removing a polar value is completed, the main processing unit 334 reduces the range between the maximum value and the minimum value by removing a positive polar value and a negative polar value. More specifically, the main processing unit 334 comprises a divide up/down processing unit 322 and a data output unit 312.

The divide up/down processing unit 322 extracts the maximum value max and the minimum value min from data output from the preprocessing unit 324 in step 336. The absolute values of the extracted max and min are compared in step 338. If the absolute value of max is greater than or equal to the absolute value of min, a divide-down process in which data bigger than max/2 are approximated to 0 is performed in step 340. If the absolute value of min is greater than the absolute value of max, a divide-up process in which data smaller than min/2 are approximated to 0 is performed in step 342. The divide up/down processing unit 322 receives divide-down or divide-up processed data again, performs the process described above M times, and generates divide up/down data. The divide-down processing and the divide-up processing will be explained in detail referring to FIGS. 10 and 11, respectively.

The data output unit 352 calculates dispersion of divide-up data and dispersion of divide-down data, each of which are output from the divide up/down processing unit 322 and are generated M times, in step 312, and selects and outputs divide-up or divide-down data corresponding to an order having the lowest dispersion.

That is, through the repetitive divide-up or -down processing, data greater than max/2 or less than min/2 are distributed around 0, that is, data which were widely dispersed from 0 are dispersed nearer to 0. Meanwhile, a higher order does not mean that divide-up or -down data are distributed much nearer to 0. Therefore, after dispersion of M-th order divide-up or -down data is obtained, a data item having the lowest dispersion among them is selected so that divide-up or -down data which are dispersed around 0 and correspond to an order having the range between the maximum value and the minimum value is the lowest can be extracted. Accordingly, after the process for removing a polar value, data having a narrower range can be obtained.

Meanwhile, for the divider 332 and divide-down processing 340, max value of data is needed, and for divide-up processing 342, min value of data is needed. This data of the max value and the min value should be transmitted to the decoding unit 360 of FIG. 5 as header information. By doing so, the decoding unit 360 can perform a normal decoding process through the inverse process of the encoding unit 300.

Figure 8:
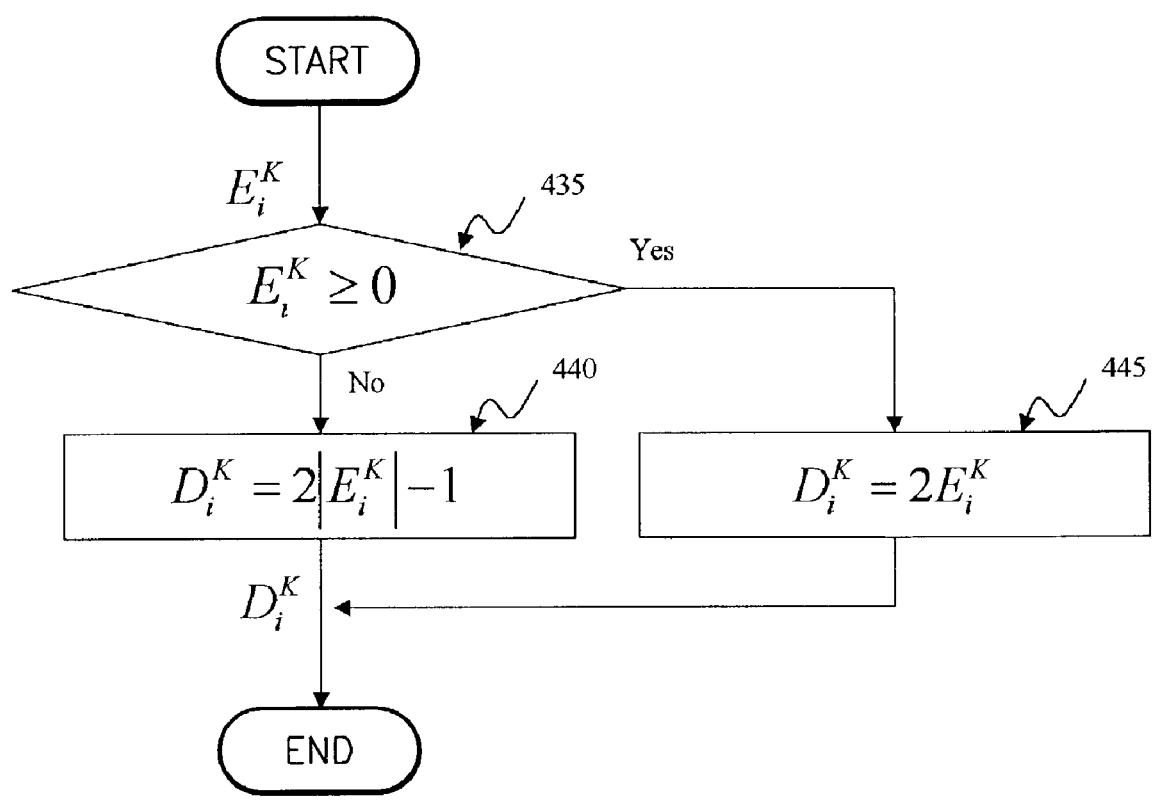
FIG. 8 is a flowchart showing in detail the operation of a fold processing unit shown in FIG. 7.

FIG. 8 is a flowchart showing in detail the operation of a fold processing unit shown in FIG. 7.

Referring to FIGS. 7 and 8, the fold processing unit 330 determines whether or not data output from the shift processing unit 328 is greater than or equal to 0 in step 435. If the data is greater than or equal to 0, the fold processing unit 330 generates a value obtained by multiplying data $E_i^K$ output from the shift processing unit 328 by 2, as the output data $D_i^K$ of the fold processing unit 330 in step 445. Meanwhile, if the output data $E_i^K$ of the shift processing unit 328 is a negative value in step 435, the fold processing unit 330 generates a value obtained by the following equation 2 as the output data $D_i^K$ of the fold processing unit 330 in step 440.

$$D_i^K = 2|E_i^K| - 1 \qquad (2)$$

This process is performed so that a negative becomes a positive odd number, and a previously positive number becomes a positive even number.

Figure 9:
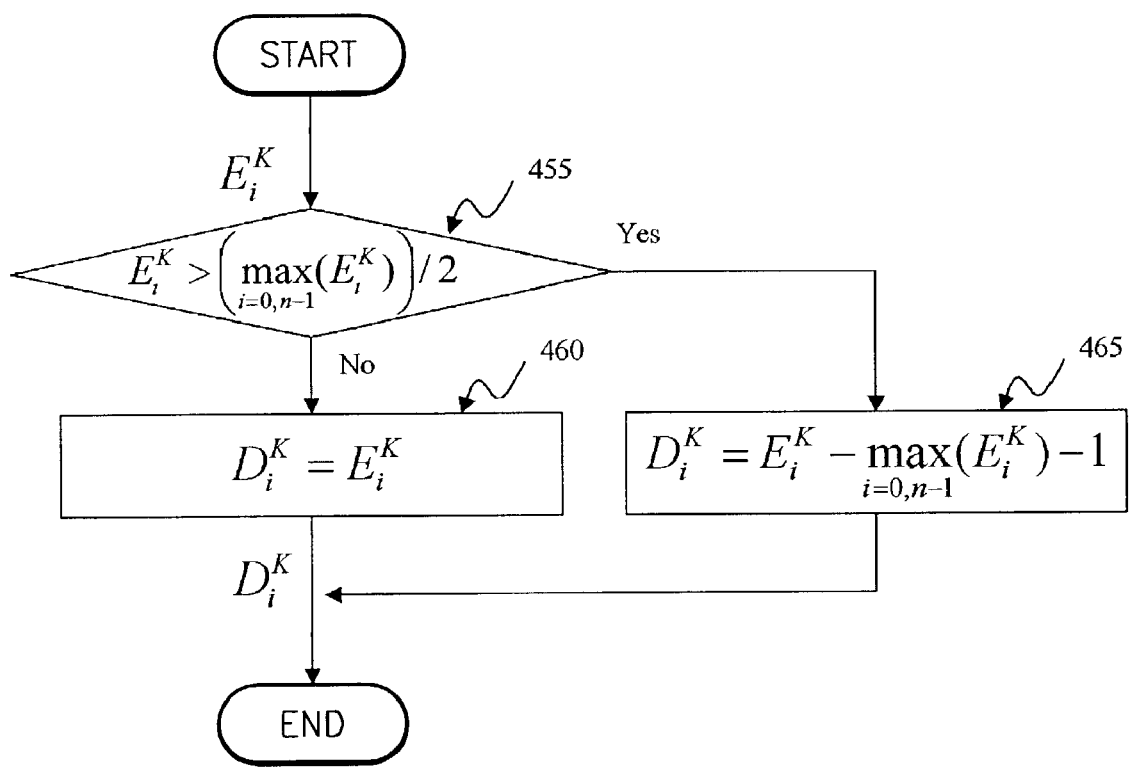
FIG. 9 is a flowchart showing in detail the operation of a divider shown in FIG. 7.

FIG. 9 is a flowchart showing in detail the operation of the divider 332 shown in FIG. 7.

Referring to FIGS. 7 and 9, after the maximum value among data output from the fold processing unit 330 is extracted, it is determined whether or not the output data $E_i^K$ of the fold processing unit 330 exceeds max/2 in step 455. If the output data $E_i^K$ of the fold processing unit exceeds max/2 in step 455, the output data $E_i^K$ is made to a negative value by the equation 3 in step 465, otherwise the output data $E_i^K$ is generated as the output data of the divider 332 without change in step 460.

$$D_i^K = E_i^K - \max(E_i^K) - 1 \qquad (3)$$

This operation of the divider 332 brings an effect of reducing the range of data. That is, if the range of the previous data is between 0 and max, the divider 332 makes the range between −max/2 and +max/2 at its maximum such that data can be dispersed around 0. Also, the more data processed in the fold processing unit 330 are dispersed gathering to the both ends, 0 and max, the narrower the range of the data becomes through this processing.

Figure 10:
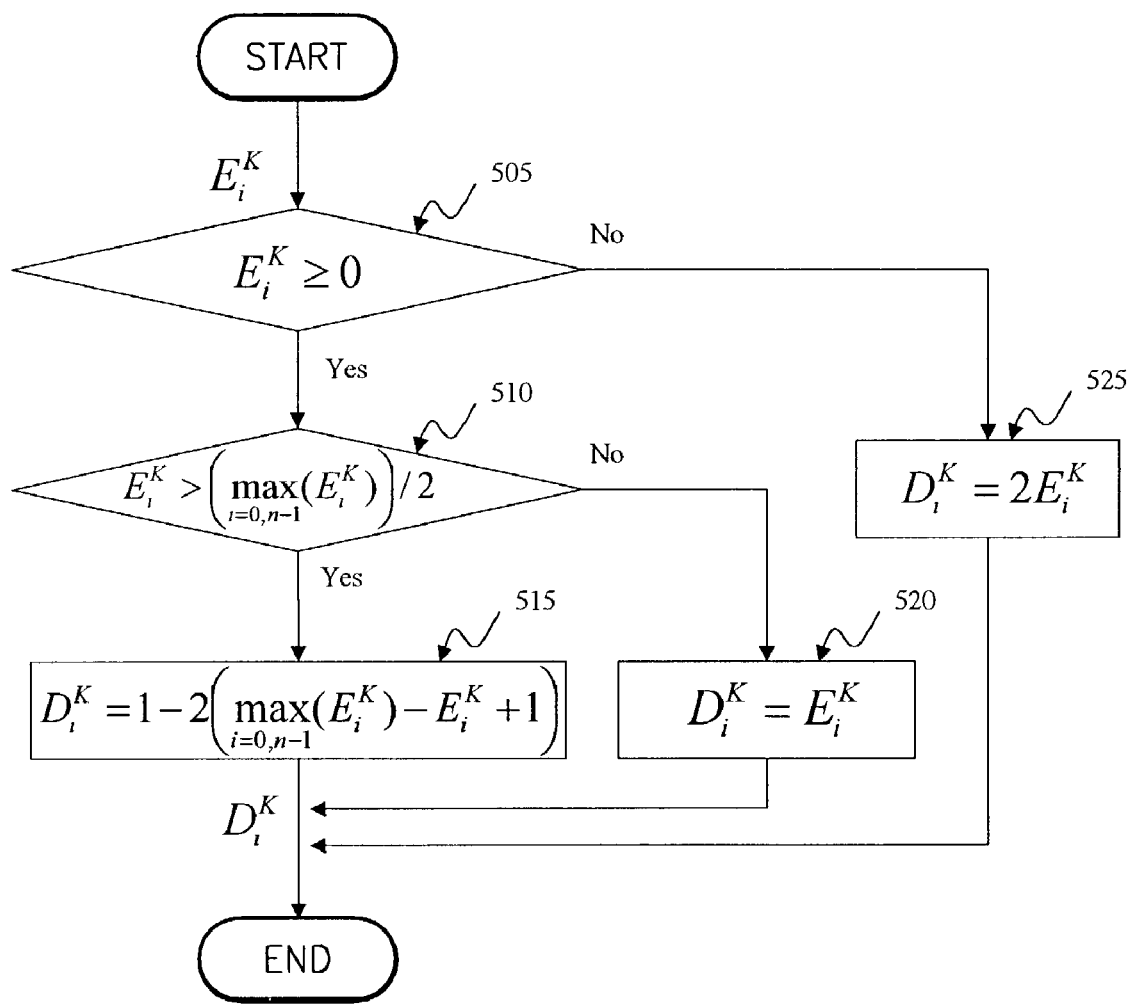
FIG. 10 is a flowchart showing in detail the divide-down operation of FIG. 7.

FIG. 10 is a flowchart showing the divide-down 340 operation of FIG. 7.

Referring to FIGS. 7 and 10, max and min data are extracted from the data output from the divider 332, and the absolutes values of max and min are compared. If the comparison results indicates |max|≧|min|, divide-down 340 processing is performed. In the divide-down 340 processing, it is first determined whether or not data $E_i^K$ output from the divider 332 is greater than or equal to 0 in step 505. If the data is a negative value, the value is doubled and generated as divide data $D_i^K$ in step 525. If data $E_i^K$ output from the divider 332 is greater than or equal to 0 in step 505, it is determined whether or not the data $E_i^K$ is greater than half the maximum value (max/2) in step 510. If the data $E_i^K$ output from the divider 332 is not greater than half the maximum value (max/2) in step 510, the value is generated as divide data $D_i^K$ without change in step 520. Meanwhile, if the data $E_i^K$ output from the divider 332 is greater than half the maximum value (max/2) in step 510, a value obtained by equation 4 is generated as divide data $D_i^K$ in step 515.

$$D_i^K = 1 - 2(\max(E_i^K) - E_i^K + 1) \quad (4)$$

Through this divide-down processing, data greater than half the max are converted into negative odd numbers, and previous negative numbers are converted into negative even numbers. The effect of this conversion is reducing the range of data.

Figure 11:
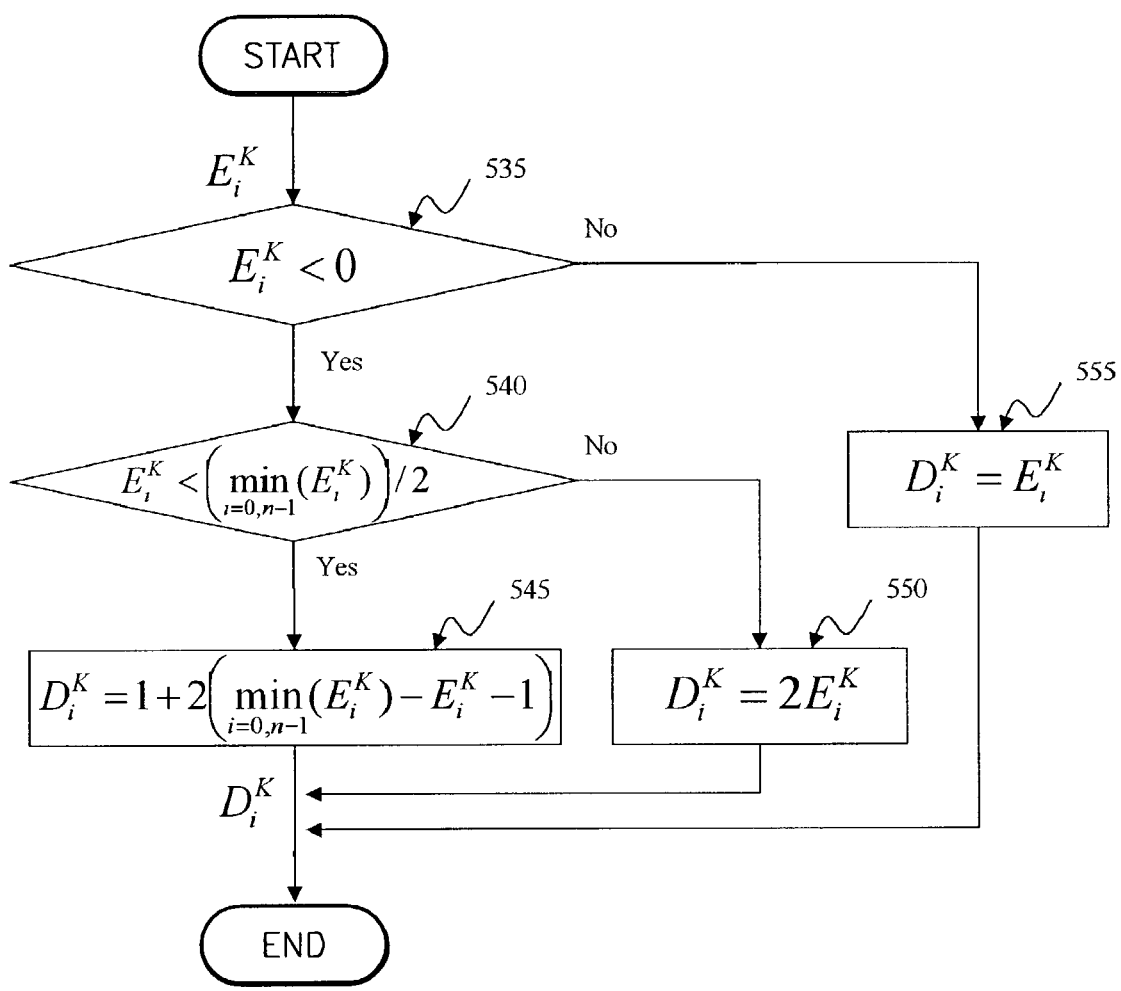
FIG. 11 is a flowchart showing in detail the divide-up operation of FIG. 7.

FIG. 11 is a flowchart showing the divide-up 342 operation of FIG. 7.

Referring to FIGS. 7 and 11, max and min data are extracted from the data output from the divider 332, and the absolute values of the data are compared. If the comparison results indicates |max|<|min|, divide-up 342 processing is performed. In the divide-up 342 processing, it is first determined whether or not data $E_i^K$ output from the divider 332 is a negative number in step 535. If data $E_i^K$ output from the divider 332 is not a negative number in step 535, the output data value of the divider 332 is generated as divide data $D_i^K$ without change in step 555. If data $E_i^K$ output from the divider 332 is a negative number in step 535, it is determined whether or not the value is smaller than half the minimum value (min/2) in step 540. If data $E_i^K$ output from the divider 332 is not smaller than half the minimum value (min/2) in step 540, the output data of the divider 332 is doubled, and generated as divide data $D_i^K$ in step 550. Meanwhile, if data $E_i^K$ output from the divider 332 is smaller than half the minimum value (min/2) in step 540, a value obtained by equation 5 is generated as divide data $D_i^K$ in step 545.

$$D_i^K = 1 + 2(\min(E_i^K) - E_i^K - 1) \quad (5)$$

Through this divide-up processing, data smaller than half the min are converted into negative odd numbers, and the remaining negative data are converted into negative even numbers. The effect of this conversion is also reducing the range of data.

Figure 12:
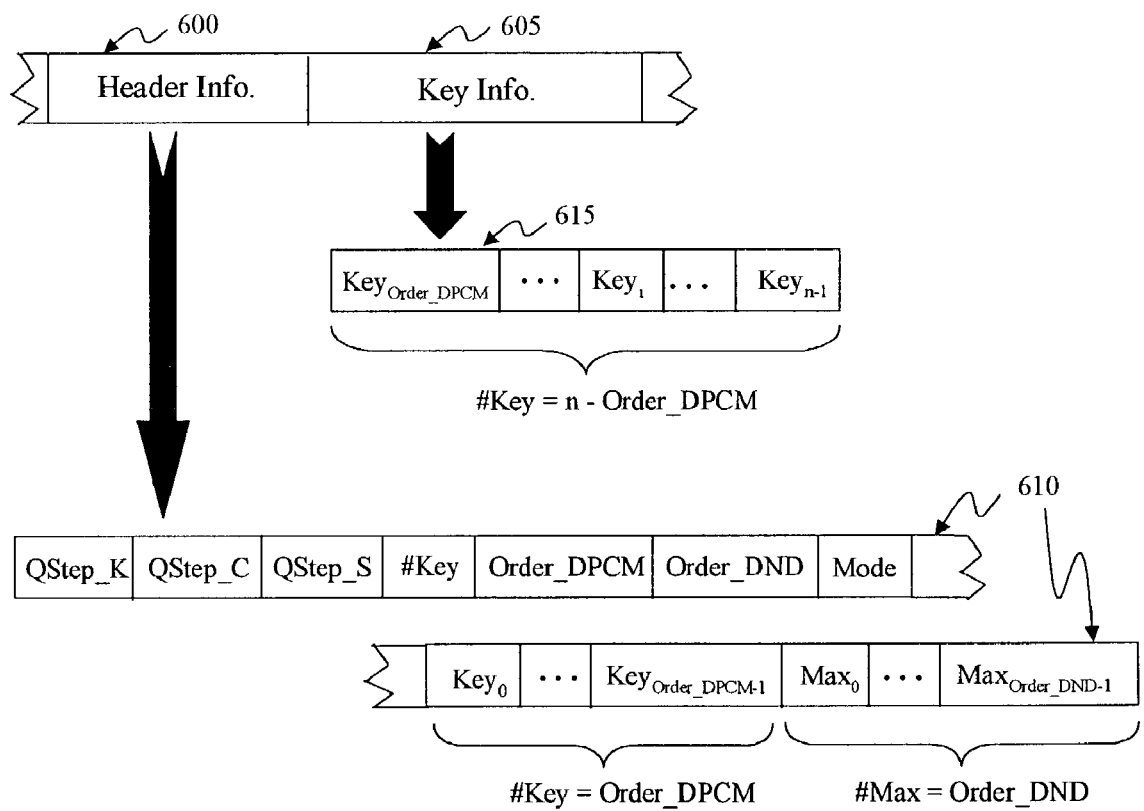
FIG. 12 is a diagram of the structure of a bit stream which is transmitted through an entropy encoder of FIG. 5.

FIG. 12 is a diagram of the structure of a bit stream which is transmitted through the entropy encoder of FIG. 5. The bit stream is broken down as header information 600 and key information 605. As key information, data obtained by encoding integer data, the range of which is reduced through quantization, DPCM, and polar value removing of real number key data, are transmitted. At this time, from the front end, the number of encoded data items corresponding to the order (Order_DPCM) of DPCM having the lowest dispersion is transmitted as header information. For example, if the order of DPCM having the lowest dispersion is the 2nd order, the first data and the second data are transmitted as header information. This is because after DPCM processing, from the front end, the number of data item have a polar value shape having great differences with other data items. That is, in order to increase coding efficiency of the entropy encoder, data having great differences to other data are removed from the key information and transmitted as header information. Accordingly, the number of key data, which is transmitted as header information, and the remaining key data are transmitted as key information 615.

The structure of header information 610 will now be explained. First, there is the number of quantization bits for key data (QStep_K). Through DPCM and polar value removing process, the range of data reduces, and accordingly the number of actual bits needed in encoding reduces. The number of bits needed at this time (QStep_C) is transmitted. Then, the number of bits needed in transmitting Mode, Max, and Min values (QStep_S), the number of keys (#Key), a DPCM order having the lowest disperion (Order_DPCM), a divide order having the lowest dispersion (Order_DND) in polar value removing unit, and a mode value (Mode). Next, the number of key data items ($Key_0, \ldots, Key_{order\_DPCM-1}$) corresponding to the order of the DPCM having the lowest dispersion (Order DPCM) are transmitted. At this time, in order to indicate signs, 1-bit sign bits are included and transmitted. Then, the same number of max or min data as a divide order (Order_DND) having the lowest dispersion are transmitted as polar values ($Max_0, \ldots, Max_{order\_DND-1}$) Theses are max values and min values of data used in divide-up 342 processing and divide-down 340 processing of the polar value removing unit 320, and max values used in the divider 332 may be included in these values, or may be separately transmitted. By using 1 bit indicating a sign, a positive max value is indicated by 0 and a negative min value is indicated by 1.

Meanwhile, as described above referring to FIG. 5, the decoding process is performed by receiving the binary bit stream data generated and sent by the encoder 300 and performing the inverse process of the encoding process described above. Here, as described above referring to FIG. 12, the binary bit stream data includes data needed in the decoding process, for example, key data and header data including information on a DPCM order having a lowest dispersion, information on a divide order having a lowest dispersion, a most frequent value, a polar value for each divide order, and a maximum value.

Referring to FIG. 5, using the binary bit stream sent from the encoder 300, the entropy decoder 365 restores header data and key data for which DPCM processing and polar value removing processing are performed.

The inverse polar value removing unit 370 restores the polar value which was removed in the polar value removing unit 320 of the encoder 300, using the most frequent value, a polar value for each divide order, and maximum value information of the header data restored in the entropy decoder 365. The inverse polar value removing unit 370 will be explained in detail referring to FIG. 13.

The inverse DPCM processing unit 375 performs the inverse DPCM processing on the key data whose polar value is restored in the inverse polar value removing unit 370, using the inverse DPCM processor shown in FIG. 3. The inverse DPCM processing is performed repeatedly the same frequency as the DPCM order having the lowest dispersion, and then the result is output.

The inverse quantizer 380 inverse quantizes the inverse DPCM data output from the inverse DPCM processing unit 375, and converts the inverse DPCM data into the original real number key value ($K^{\wedge}$). In the restored key data ($K^{\wedge}$), the same extent of error occurring in the quantizing process occurs in the inverse quantization process.

Figure 13:
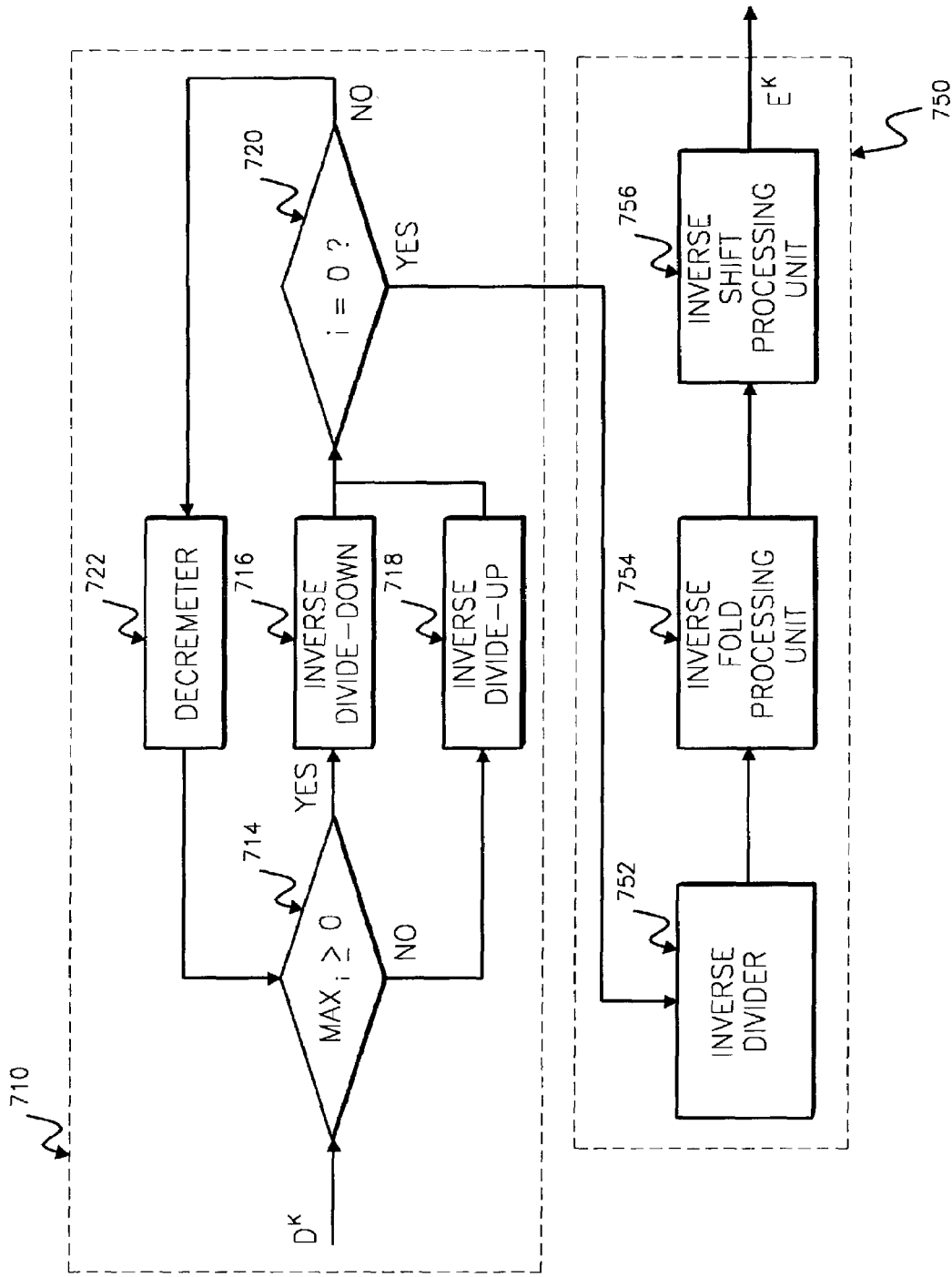
FIG. 13 is a block diagram of a preferred embodiment of an inverse polar value removing unit 370 of FIG. 5 according to the present invention.

FIG. 13 is a block diagram of a preferred embodiment of an inverse polar value removing unit 370 of FIG. 5 according to the present invention. The inverse polar value removing unit of FIG. 13 is for an inverse process of the process performed by the polar value removing unit shown in FIG. 7, and comprises a main processing unit 710 and a post-processing unit 750.

Referring to FIG. 13, the main processing unit 710 performs the inverse process of the process performed by the main processing unit 334 of FIG. 7. First, the main processing unit 710 compares the polar value of each divide order with 0 in step 714. If the polar value is not less than, inverse divide-down processing on the key data is performed in step 716, and if the polar value is less than 0, inverse divide-up processing on the key data is performed in step 718, and positive or negative polar value of the key data is restored. Here, as the inverse divide-down processing, the inverse process of the divide-down processing shown in FIG. 10 is performed, and the processing result is presented as the equation 6:

$$E_i^K = D_i^K \ldots (D_i^K \geq 0)$$

$$E_i^K = (Max_i + 1) + (D_i^K - 1)/2 \ldots (D_i^K < 0 \text{ an odd number})$$

$$E_i^K = D_i^K / 2 \ldots (D_i^K < 0, \text{ an even number}) \quad (6)$$

Likewise, as the inverse divide-up processing, the inverse process of the divide-up processing shown in FIG. 11 is performed, and the processing result is presented as the equation 7:

$$E_i^K = D_i^K \ldots (D_i^K \geq 0)$$

$$E_i^K = (Max_i - 1) - (D_i^K - 1)/2 \ldots (D_i^K < 0, \text{ an odd number})$$

$$E_i^K = D_i^K / 2 \ldots (D_i^K < 0, \text{ an even number}) \quad (7)$$

In the equations 6 and 7, $E_i^K$ is data obtained by inverse divide-down or -up processing, $D_i^K$ is key data restored in the entropy decoder 365, and $Max_i$ denotes the polar value for each divide order.

After the inverse divide-up or -down processing, it is determined whether or not the divide order (i) is 0 in step 720, and if the divide order is 0, the post-processing unit 750 performs its operation. Meanwhile, if the divide order (i) is not 0, the divide order (i) decreases by 1 in step 722, and till the divide order (i) becomes 0, the inverse divide-down or -up processing is repeated.

The post processing unit 750 performs the inverse process of the process performed by the preprocessing unit 324 of FIG. 7. The post processing unit 750 shifts the data, whose polar value is restored in the main processing unit 710, by the most frequent value such that the key data dispersed centering around 0 are restored to be dispersed centering around the most frequent value. More specifically, the post-processing unit 750 is constructed to include an inverse divider 752, an inverse fold processing unit 754, and an inverse shift processing unit 756.

The inverse divider 752 performs the inverse process of the process performed by the divider 332 of FIG. 7. According to the sizes of the data whose polar values are restored in the main processing unit 710, the maximum value of the restored header data is added to the data restored in the main processing unit 710 so that the data whose polar values are restored are equal to or greater than 0. More specifically, if the key data which is inverse divide-down or -up processed in the main processing unit 710 is equal to or greater than 0, the value is maintained, and if the key data is less than 0, (maximum value +1) is added to the data generated in the main processing unit 710.

The inverse fold processing unit 754 performs the inverse process of the process performed by the fold processing unit shown in FIG. 7. The inverse fold processing unit 754 determines whether the data processed in the inverse divider 752 is an odd number or an even number, and generates data calculated based on the equation 8, as inverse fold processed data.

$$E^K = (D^K + 1)/(-2) \ldots (D^K = \text{an odd number})$$

$$E^K = D^K / 2 \ldots (D^K = 0 \text{ or an odd number}) \quad (8)$$

(Here, $E^K$ denotes the inverse fold processed data, and $D^K$ denotes data processed in the inverse divider 752.)

The inverse shift processing unit 756 shifts the data processed in the inverse fold processing unit 754, by the most frequent value from the header data so that the data dispersed centering around 0 are restored to be dispersed centering around the most frequent value.

In the present invention having the processes described above, in encoding key data of animation data, by performing DPCM appropriate times according to the characteristics of the data, a data item having a lower dispersion is selected, and polar value removal is performed repeatedly for the data item so that the range of data is more reduced. Therefore, in the data characteristics, the data are converted into a shape more efficient and appropriate for compression and encoding through the entropy encoder 350 such that encoding efficiency increases. That is, in generating a binary bit stream, the redundancy of binary data increases and the redundancy of this bit data is removed in the entropy encoder such that encoding efficiency increases. Accordingly, by increasing the encoding efficiency of key data, a huge amount of animation data is compressed more efficiently and the amount of the data is reduced such that efficient storage, transmission, and processing can be performed.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.) and optically readable media (e.g., CD-ROMs, DVDs, etc.) Also, the computer readable recording media can be scattered on computer systems connected through a network and can store and execute a computer readable code in a distributed mode.

Optimum embodiments have been explained above and are shown. However, the present invention is not restricted to the above-described embodiments and many variations are possible within the spirit and scope of the present invention. The scope of the present invention is not determined by the above description but by the accompanying claims.

What is claimed is:

1. A coding apparatus for encoding key data corresponding to time variables among graphic animation, the coding apparatus comprising:
    a quantizer which quantizes the key data and generates quantized data;
    a differential pulse code modulation (DPCM) processing unit which DPCM processes the quantized data, receives the DPCM processed data, and by repeatedly performing DPCM processing, selects and outputs DPCM data having a lowest dispersion among N-th order DPCM data generated in the DPCM processing;
    a polar value removing unit which reduces a range of data by removing a polar value in the DPCM data output from the DPCM processing unit; and
    an entropy encoder which removes the redundancy of binary bits in the data output from the polar value removing unit and generates a compressed and encoded binary bit stream.

2. The coding apparatus of claim 1, wherein the DPCM processing unit comprises:
    an N-th DPCM processing unit which DPCM processes the quantized data, receives the DPCM processed data, and by repeatedly performing the DPCM processing, generates N-th order DPCM data;

a dispersion processing unit which obtains and outputs a dispersion of DPCM data output from the N-th order DPCM processing unit for each order; and a minimum dispersions extracting unit which selects DPCM data corresponding to an order having a lowest dispersion among the dispersions calculated in the dispersion processing unit, and outputs the selected DPCM data to the polar value removing unit.

3. The coding apparatus of claim 1, wherein the polar value removing unit comprises:

a preprocessing unit which makes data having a highest frequency among the data output from the DPCM processing unit become 0, and remaining data be placed dispersed around 0 so that an average value of the remaining data is close to 0; and a main processing unit which removes a positive polar value and a negative polar value among the preprocessed data so that the range between a maximum value and a minimum value is reduced.

4. The coding apparatus of claim 3, wherein the preprocessing unit comprises:

a mode generator which obtains data having a highest frequency among differential data output from the DPCM processing unit as a mode value;

a shift processing unit which subtracts the mode value obtained by the mode generator from the differential data so that the differential data shift as much as the mode value;

a fold processing unit which makes data less than 0 among the shift processed data become positive numbers; and a divider which subtracts a predetermined value from the data processed in the fold processing unit according to a size of data so that a data range between a maximum value and a minimum value is reduced.

5. The coding apparatus of claim 3, wherein the main processing unit comprises:

a divide up/down processing unit which extracts a maximum value and a minimum value from the preprocessed data, compares the absolute values of the maximum value and the minimum value, according to the result of the comparison performs repeatedly M times divide-down processing in which data greater than half the maximum value are converted into a value approximated to 0, or divide-up processing in which data smaller than half the maximum value are converted into a value approximated to 0, and generates divide-processed data; and a data output unit which calculates a dispersion of divide-up data or divide-down data output from the divide up/down processing unit for each order, and selects and outputs divide-processed data corresponding to an order having a lowest dispersion.

6. A coding method for coding key data corresponding to time variables among graphic animation data, the coding method comprising:

(a) quantizing the key data and generating quantized data;

(b) differential pulse code modulation (DPCM) processing the quantized data, receiving the DPCM processed data, and by repeatedly performing DPCM processing, selecting and outputting DPCM data having a lowest dispersion among N-th order DPCM data generated in the DPCM processing;

(c) reducing a changing range of data by removing a polar value in the DPCM data output in step (b); and (d) removing a redundancy of binary bits in the data output in step (c) and generating a compressed and encoded binary bit stream.

7. The coding method of claim 6, wherein step (b) comprises:

(b1) DPCM processing the quantized data, receiving the DPCM processed data, and by repeatedly performing the DPCM processing, generating N-th order DPCM data;

(b2) calculating a dispersion of DPCM data for each order generated in step (b2); and (b3) selecting and outputting DPCM data corresponding to an order having a lowest dispersion among the dispersions calculated in step (b2).

8. The coding method of claim 7, wherein step (c) comprises:

(c1) obtaining data having a highest frequency among differential data generated in step (b) as a mode value;

(c2) subtracting the mode value from the respective differential data;

(c3) making data less than 0 among the data processed in step (c2) become positive numbers;

(c4) performing divide processing which reduces the data range between a maximum value and a minimum value by subtracting a predetermined value from the data processed in step (c3) according to a size of data;

(c5) extracting a maximum value and a minimum value from the preprocessed data, comparing the absolute values of the maximum value and the minimum value, according to the result of the comparison performing repeatedly M times a process in which data greater than half the maximum value are converted into a value approximated to 0, or data smaller than half the maximum value are converted into a value approximated to 0, and generating divide-processed data; and (c6) calculating a dispersion of data generated in step (c5) for each order, and selecting and outputting divide-processed data corresponding to an order having a lowest dispersion as data in which polar values are removed.

9. A computer readable medium having embodied thereon a computer program for the coding method of claim 6.

10. A method for converting data for efficient encoding of key data corresponding to time variables among graphic animation, the method comprising:

(a) receiving transmission data desired to be transmitted;

(b) obtaining data having a highest frequency among the transmission data as a mode value;

(c) subtracting the mode value from the respective transmission data;

(d) making data less than 0 among the data processed in step (c) become positive numbers;

(e) performing divide processing which reduces a data range between a maximum value and a minimum value by subtracting a predetermined value from the data processed in step (d) according to a size of data;

(f) extracting a maximum value and a minimum value from the preprocessed data, comparing the absolute values of the maximum value and the minimum value, according to the result of the comparison performing repeatedly M times a process in which data greater than half the maximum value are converted into a value approximated to 0, or data smaller than half the maximum value are converted into a value approximated to 0, and generating divide-processed data;

(g) calculating a dispersion of data generated in step (f) for each order, and selecting divide-processed data corresponding to an order having a lowest dispersion as data in which polar values are removed; and (h) outputting the data in which polar values are removed as converted transmission data for encoding of key data corresponding to time variables among graphic animation, wherein the data range of the converted transmission data is reduced with respect to a data range of the transmission data desired to be transmitted.

11. The method of claim 10, wherein step (d) comprises:

(d1) determining whether or not a value output in step (c) is greater than or equal to 0;

(d2) if it is determined in step (d1) that the value is a negative number, making the data generated in step (d) positive numbers by doubling an absolute value of the value, and subtracting 1 from the doubled result; and (d3) if it is determined in step (d1) that the value is a positive number, doubling the data value generated in step (d2).

12. The method of claim 10, wherein step (e) comprises:

(e1) determining whether or not the data generated in step (d) exceeds half a maximum value;

(e2) if the data exceeds half the maximum value in step (e1), making the data negative numbers by subtracting (maximum value+1) from the data generated in step (d); and (e3) if the data does not exceed half the maximum value in step (e1), maintaining the value without change.

13. The method of claim 10, wherein step (f) comprises:

(f1) extracting the maximum value and the minimum value of the data generated in step (e) and comparing the absolute values of the data;

(f2) if the absolute value of the maximum value is greater than the absolute value of the minimum value in step (f1), performing divide-down processing in which data greater than half the maximum value is approximated to a value close to 0, and performing step (e1) and increasing a divide order by 1;

(f4) if the absolute value of the minimum value is greater than the absolute value of the maximum value in step (f1), performing divide-up processing in which data smaller than half the minimum value is approximated to a value close to 0, and performing step (e1) and increasing the divide order by 1;

(f4) if the divide order is M, obtaining a dispersion of divide-down or divide-up processed data for each order; and (f5) generating divide-down or divide-up data having a lowest dispersion in step (f4) as data in which polar values are removed.

14. The method of claim 13, wherein step (f2) comprises:

(f21) if the absolute value of the maximum value is greater than the absolute value of the minimum value in step (f1), determining in step (e) whether or not the divide-processed data is greater than or equal to 0;

(f22) if the divide-processed data is a negative number in step (f21), multiplying the divide-processed data by 2, and generating the result as divide-down data;

(f23) if the divide-processed data is greater than or equal to 0, determining whether or not the divide-processed data exceeds half the maximum value;

(f24) if the divide-processed data exceeds half the maximum value in step (f23), generating data calculated by the following equation as divide-down data:

$$D_i^K = 1 - 2(\max(E_i^K) - E_i^K + 1)$$

Where $D_i^K$ denotes divide-down data, $E_i^K$ denotes the divide-processed data, and $\max(E_i^K)$ denotes the maximum value;

(f25) if the divide-processed data does not exceed half the maximum value in step (f23), generating the divide-processed data as divide-down data.

15. The method of claim 13, wherein step (f3) comprises:

(f31) if the absolute value of the minimum value is greater than the absolute value of the maximum value in step (f1), determining in step (e) whether or not the divide-processed data is a negative number;

(f32) if the divide-processed data is not a negative number in step (f31), generating the divide-processed data as divide-up data without change;

(f33) if the divide-processed data is a negative number in step (f31), determining whether or not the divide-processed data is smaller than half the minimum value;

(f34) if the divide-processed data is smaller than half the minimum value in step (f33), generating data calculated by the following equation as divide-up data:

$$D_i^K = 1 + 2(\min(E_i^K) - E_i^K - 1)$$

Where $D_i^K$ denotes divide-up data, $E_i^K$ denotes the divide-processed data, and $\max(E_i^K)$ denotes the minimum value;

(f35) if the divide-processed data is not smaller than half the minimum value in step (f33), generating a value obtained by multiplying the divide-processed data by 2, as divide-up data.

16. A computer readable medium having embodied thereon a computer program for the data converting method of claim 10.

17. A data processing system for coding and/or decoding key data corresponding to time variables among graphic animation data, the data processing system comprising:

an encoder which comprises:

a quantizer which quantizes the key data and generates quantized data;

a differential pulse code modulation (DPCM) processing unit which DPCM processes the quantized data, receives the DPCM processed data, and by repeatedly performing DPCM processing, selects and outputs DPCM data having the lowest dispersion among N-th order DPCM data generated in the DPCM processing;

a polar value removing unit which reduces the changing range of data by removing a polar value in the DPCM data output form the DPCM processing unit; and an entropy encoder which removes the redundancy of binary bits in the data output from the polar value removing unit and generates a compressed and encoded binary bit stream; and a decoder which receives a binary bit stream which is compressed, coded, and transmitted from the encoder, and restores the binary bit stream to original key data through the inverse process of the encoding which is performed in the encoder.

18. A computer readable medium having stored thereon a structure for representing encoded key data corresponding to time variables among graphic animation generated by the coding apparatus of claim 1, the structure for representing encoded key data comprising:

header information which comprises:

a number of quantization bits to which the key data is quantized;

a number of actual bits needed in encoding the key data;

a number of bits needed in transmitting a mode value, a minimum value, and a maximum value;

a number of the key data;

a Differential Pulse Code Modulation (DPCM) order having a lowest dispersion and a divide order having the lowest dispersion, respectively; and the mode value, the minimum value, and the maximum value, respectively; and key information which comprises encoded key data.

19. The computer readable medium of claim 18, wherein the header information portion of the structure for representing encoded key data further comprises first through n-th encoded key data among data obtained by an n-th order DPCM whose result has a minimum dispersion, and wherein the key information comprises a number (n) of the encoded key data in the header information and remaining encoded key data which is not in the header information.

20. The computer readable medium of claim 19, wherein for the encoded key data corresponding to the order of the DPCM, and the mode value, the minimum value, and the maximum value, the header information Portion of the structure for representing encoded key data further comprises a respective sign bit indicating a sign of the corresponding data.

21. A decoding apparatus which receives a binary bit stream from an external coding apparatus, the binary bit stream obtained by compressing and encoding header data, which includes information on a DPCM order having a lowest dispersion, information on a divide order having the lowest dispersion, a most frequent value, a maximum value, and information on a polar value for each divide order that are used in a polar value removing process in the coding apparatus, and key data that is DPCM processed and polar value removing processed, and restores original key data corresponding to time variables in graphic animation data, the decoding apparatus comprising:

an entropy decoder which restores the header data and key data for which DPCM processing and polar value removing processing are performed, using the received binary bit stream;

an inverse polar value removing unit which restores a polar value removed in the polar value removing process of the coding apparatus, using the most frequent value, the maximum value, and information on a polar value for each divide order of the header data restored in the entropy decoder;

an inverse DPCM processing unit which repeatedly performs the inverse DPCM processing for the key data whose polar value is restored in the inverse polar value removing unit, and outputs the result, wherein the inverse DPCM processing is performed repeatedly with a same frequency as the DPCM order having the lowest dispersion; and an inverse quantizer which inverse quantizes the inverse DPCM data that is output from the inverse DPCM processing unit, and generates the inverse quantized data as original key data.

22. The decoding apparatus of claim 21, wherein the inverse polar value removing unit comprises:

a main processing unit which compares the polar value of each divide order in the restored header data, with 0, and if the polar value is equal to or greater than 0, inverse divide-down processes the key data restored in the entropy decoder, and if the polar value is less than 0, inverse divide-up processes the key data so that a positive or negative polar value is restored; and a post-processing unit which shifts the data whose polar value is restored in the main processing unit, by the most frequent value such that the key data dispersed centering around 0 are restored to be dispersed centering around the most frequent value.

23. The decoding apparatus of claim 22, wherein the post-processing unit comprises:

an inverse divider which according to sizes of the data whose polar values are restored in the main processing unit, a predetermined value is added to the data whose polar values are restored so that the data whose polar values are restored are equal to or greater than 0;

an inverse fold processing unit which converts an odd number in the data processed by the inverse divider, into a negative number; and an inverse shift processing unit which shifts the data processed in the inverse fold processing unit by the most frequent value so that the data dispersed centering around 0 are restored to be dispersed centering around the most frequent value.

24. A decoding method performed in a decoding apparatus which receives a binary bit stream from an external coding apparatus, the binary bit stream obtained by compressing and encoding header data, which includes information on a DPCM order having a lowest dispersion, information on a divide order having the lowest dispersion, a most frequent value, a maximum value, and information on a polar value for each divide order that are used in a polar value removing process in the coding apparatus, and key data that is DPCM processed and polar value removing processed, and restores original key data corresponding to time variables in graphic animation data, the decoding method comprising:

(a) restoring the header data and key data for which DPCM processing and polar value removing processing are performed, using the received binary bit stream;

(b) restoring a polar value removed in the polar value removing process of the coding apparatus, using the most frequent value, the maximum value, and information on a polar value for each divide order of the header data restored in the step (a);

(c) repeatedly performing inverse DPCM processing for the key data whose polar value is restored in the step (b), wherein the inverse DPCM processing is performed repeatedly with a same frequency as the DPCM order having the lowest dispersion; and (d) inverse quantizing the data that is inverse DPCM processed in the step (c), and generating the inverse quantized data as the original key data.

25. The decoding method of claim 24, wherein the step (b) comprises:

(b1) comparing the polar value of each divide order in the restored header data, with 0, and if the polar value is equal to or greater than 0, inverse divide-down processing the key data restored in the entropy decoder, and if the polar value is less than 0, inverse divide-up processing the key data so that a positive or negative polar value is restored; and (b2) shifting the data whose polar value is restored in the step (b1), by the most frequent value such that the key data dispersed centering around 0 are restored to be dispersed centering around the most frequent value.

26. The decoding method of claim 25, wherein the inverse divide-down processing of the step (b1) comprises:

(b21) if the key data restored in the step (a) is equal to or greater than 0, generating the restored key data as the inverse divide-down processed data without change;

(b22) if the key data restored in the step (a) is less than 0 and is an odd number, generating data calculated by the following equation as the inverse divide-down processed data:

$$E_i^K = (\text{Max}_i + 1) + (D_i^K - 1)/2$$

(Where, $E_i^K$ is data obtained by inverse divide-down processing, $\text{Max}_i$ denotes the polar value for each divide order, and $D_i^K$ is key data restored in the step (a); and (b23) if the key data restored in the step (a) is less than 0 and is an even number, generating the result of dividing the key data restored in the step (a) by 2, as the inverse divide-down processed data; and the inverse divide-up processing of the step (b1) comprises:

(b24) if the key data restored in the step (a) is equal to or greater than 0, generating the restored key data as the inverse divide-up processed data without change;

(b25) if the key data restored in the step (a) is less than 0 and is an odd number, generating data calculated by the following equation as the inverse divide-up processed data:

$$E_i^K = (\text{Max}_i - 1) - (D_i^K - 1)/2$$

(Where, $E_i^K$ is data obtained by inverse divide-up processing, $\text{Max}_i$ denotes the polar value for each divide order, and $D_i^K$ is key data restored in the step (a)); and (b26) if the key data restored in the step (a) is less than 0 and is an even number, generating the result of dividing the key data restored in the step (a) by 2, as the inverse divide-up processed data.

27. The decoding method of claim 25, wherein the step (b2) comprises:

(b21) making the data whose polar values are restored in step (b1), equal to or greater than 0, by adding the maximum value to the data according to the size of the data;

(b22) inverse fold processing the data processed in step (b21) so that odd numbers in the data are converted into negative numbers; and (b23) inverse shifting processing the data inverse fold processed in the step (b22), by shifting the data by the most frequent value so that the data dispersed centering around 0 are restored to be dispersed centering around the most frequent value.

28. The decoding method of claim 27, wherein in step (b21), it is determined whether or not the data generated in the step (b1) is greater than 0, and if the data is equal to or greater than 0, maintains the value, and if the data is less than 0, adds (the maximum value +1) to the data generated in the step (b1).

29. The decoding method of claim 27, wherein the step (b22) comprises:

(b221) if the data processed in the step (b21) is an odd number, generating the data calculated based on the following equation, as inverse fold processed data:

$$E_K = (D^K + 1)/(-2)$$

(Where, $E^K$ denotes the inverse fold processed data, and $D^K$ denotes data processed in the step (b21); and (b222) if the data processed in the step (b21) is 0 or an even number, generating the result of dividing the data processed in the step (b21) by 2, as inverse fold processed data.

30. A computer readable medium having embodied thereon a computer program for the decoding method of claim 24.

31. A computer readable medium having stored thereon a structure for representing encoded graphic animation key data, the structure for representing encoded graphic animation key data comprising:

a header information field which comprises:
    a field which stores a number of quantization bits to which key data is quantized;
    a field which stores a number of actual bits needed in encoding key data;
    a field which stores a number of bits needed in transmitting a mode value, a minimum value, and a maximum value;
    a field which stores a number of key data;
    a field which stores a differential pulse code modulation (DPCM) order having a lowest dispersion and a divide order having the lowest dispersion, respectively; and
    a field which stores a mode value, a minimum value, and a maximum value, respectively; and
a key information field which stores encoded key data.

32. The computer readable medium of claim 31, wherein the header information field of the structure for representing encoded graphic animation key data further comprises a field which stores first through n-th encoded key data among data obtained by an n-th order DPCM whose result has a minimum dispersion, and wherein the key information field stores information on the number (n) of the encoded key data stored in the header information field, and stores remaining encoded key data which is not stored in the header information field.

33. The computer readable medium of claim 32, wherein each of the fields of the structure for representing encoded graphic animation key data storing the encoded key data corresponding to the order of the DPCM, and the fields storing the mode value, the minimum value, and the maximum value, respectively, stores a sign bit indicating a sign of data stored in the field.

* * * * *